March 2, 1926.  A. MATTHEWS ET AL  1,575,434
RETREADING AND VULCANIZING APPARATUS FOR TIRES
Filed Nov. 14, 1924
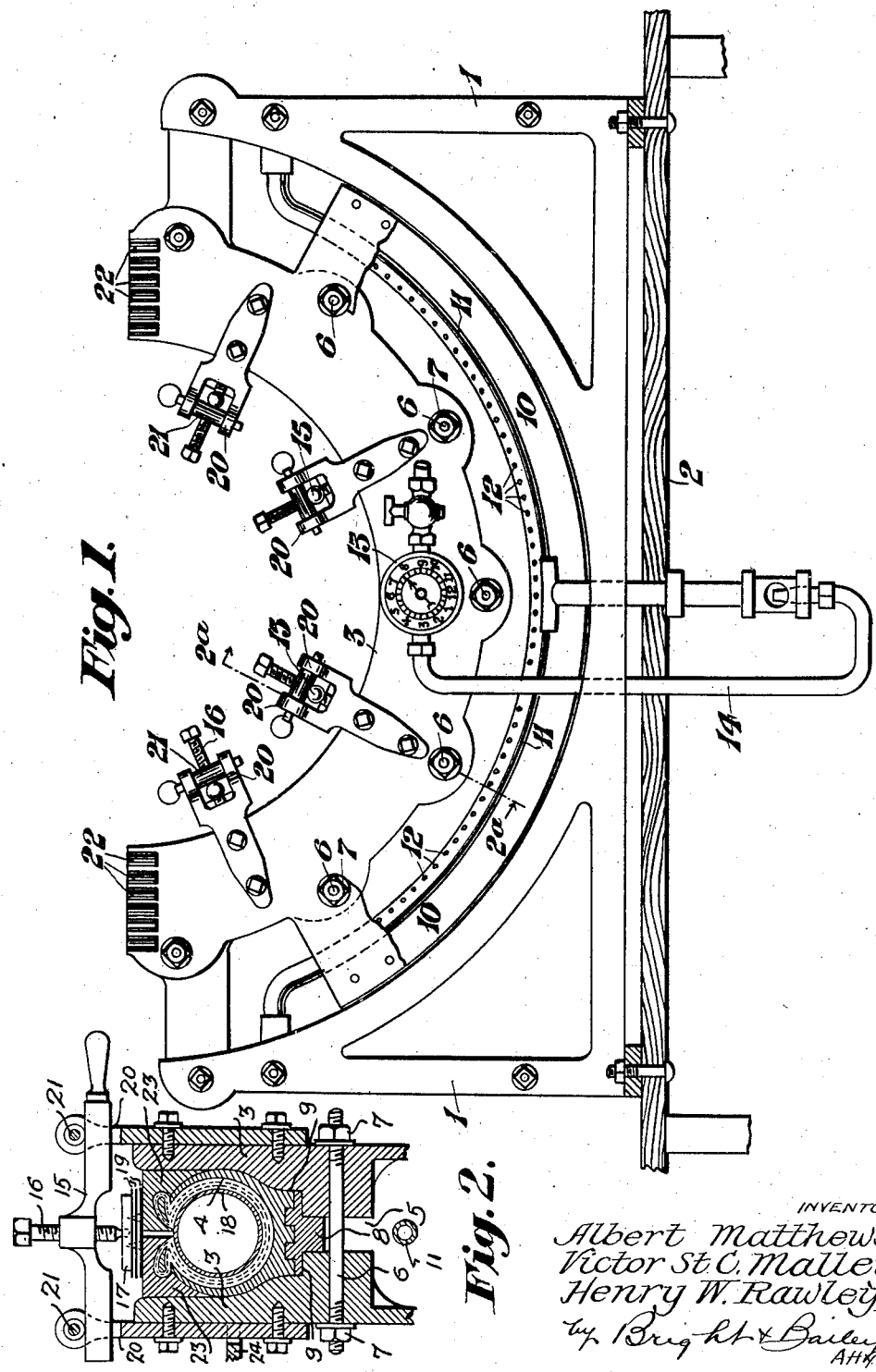
INVENTORS
Albert Matthews,
Victor St C. Malley,
Henry W. Rawley,
by Bright & Bailey
ATTYS.

Patented Mar. 2, 1926.

1,575,434

UNITED STATES PATENT OFFICE.

ALBERT MATTHEWS, VICTOR ST. CLAIR MALLEY, AND HENRY WILLIAM RAWLEY, OF BRIGHTON, ENGLAND.

RETREADING AND VULCANIZING APPARATUS FOR TIRES.

Application filed November 14, 1924. Serial No. 749,905.

*To all whom it may concern:*

Be it known that we, ALBERT MATTHEWS, VICTOR ST. CLAIR MALLEY and HENRY WILLIAM RAWLEY, subjects of the King of Great Britain, residing at 2 Park Road Terrace, 18 Grafton Street, and Tuanda, 1 Grantham Road, respectively, all in Brighton, Sussex, England, have invented Improvements in Retreading and Vulcanizing Apparatus for Tires; and we do hereby declare that the following to be a full, clear, and exact description in the invention, such as will enable others skilled in the art to which it appertains to make and use the same.

The object of this invention is to provide in a plant for retreading re-rubbering and vulcanizing tires means whereby adjustment of a single plant may be readily effected to accommodate various dimensions of tires.

Broadly our invention resides in the provision of a mould which can be adjusted to accommodate different dimensions of tires.

According to the preferred embodiment of our invention a plant of the character specified comprises a frame upon which are supported a pair of parallel corresponding arcuate members adapted to be adjustably spaced and to receive between them a detachable matrix and the tire to be treated, means for applying heat directly to said matrix, and transversely adjustable means for applying pressure to the tire.

In order that the invention may be clearly understood and readily carried into effect an embodiment of same will now be described by aid of the accompanying drawings, wherein:—

Fig. 1 is a side elevation of the plant,

Fig. 2 is a cross sectional view of the mould on the line 2$^a$—2$^a$ of Fig. 1, and employing an air bag during treatment of the beads and juxtaposed parts of the tire.

Referring to the drawings the plant comprises a frame or stand 1 adapted to be bolted or otherwise secured to a suitable base 2 and the upper surface of this frame is recessed arcuately for the reception of a correspondingly shaped mould 3 constituted by one or more segmental members shaped internally to accommodate a portion of the tire.

The mould is divided along its longitudinal centre as at 5 and bolts 6 are passed transversely through the two sections provided by such division whereby the effective width of the mould may be adjusted by adjusting the nuts 7 of these bolts. A matrix 8 corresponding to the required tread of the tire is detachably inserted in a channel 9 in the longitudinal centre of the mould, whereby any particular design of tread may be selected by employing a number of interchangeable matrices.

Located in a space 10 between the frame 1 and the mould 3 or within a channel in the upper surface of the frame 1 is a length, or a plurality of lengths of piping 11 having jets 12 whereby gas flames can impinge on to the mould 3 and matrix 8 and so maintain same at the requisite degree of heat, the matrix receiving the most heat. To avoid overheating a thermostatic valve 13 is included with the mould and is included in the gas conductors 14 whereby overheating is automatically compensated for by a reduction in the supply of gas in well known manner. By this means of heating, the apparatus can be relied upon to work at any predetermined temperature and further obviates the existing complicated and expensive steam jackets, boilers steam pipes and other accessories dependent upon steam heating, and further no provision is necessary to prevent leakage of steam at joints as is at present essential. It will be apparent that electrical heating may be employed and the temperature controlled instead of or in addition to gas.

The two divided portions of the mould are bridged across the top by a number of movably supported cross bars 15 each of which carries at about its median position a vertical adjustable screw 16 carrying at its base a head 17 adapted to be engaged with the usual sand or air bag 18 positioned inside the tire being treated. Each head preferably carries a strong coiled, laminated or leaf spring 19 whereby a resilient pressing action is obtained when using a sand bag.

When a complete re-rubbering of the side walls and beads of a tire is required, a bead and side wall mould 23 (Fig. 2) is provided adapted to accommodate the portion of the tire in juxtaposition to the beads such mould 23 preferably comprising two symmetrical halves as shown in Fig. 2 to allow for adjustment of the mould 3. When the tire is being retreaded a sand bag 26 would be employed in known manner and the heads 17 with their springs 19 engaged directly against the sand bag.

To ensure the vertical pressure screws 16 always being located over the longitudinal centre line of the mould, each cross bar is self centering and adjustable and is capable of movement transversely across the top of the mould, and this may be effected by supporting each cross bar with a pair of upstanding bifurcated lugs 20 secured to opposite sides of the mould, the cross bar resting between the furcations of the lugs, and engaging rollers 21 carried by pins passed through the furcations across the top surface of the cross bar, the arms preferably being symmetrically curved so that any upward pressure through the vertical adjusting screws will result in the cross bars adjusting themselves owing to their free sliding action against the rollers. However it is apparent that adjustment by hand if necessary will be a very simple matter.

Instead of employing the screw as above described for effecting pressure on the tire, any known method of air pressure may be employed.

The ends of the mould are provided with a plurality of cooling blades 22 for preventing overcuring of the overlap section of the tire.

A retreading or vulcanizing plant according to our invention effects a great economy in fuel, as unnecessary radiation or excessive heating is automatically prevented.

What we claim is:

1. In a tire vulcanizer, a tire receiving mould having spaced side portions, means for applying pressure to a tire disposed within said mould comprising a member bridging the side portions of said mould and carrying a clamp screw for applying said pressure, and means slidably connecting said member with the side portions of said mould to permit correct positioning of said clamp screw with respect to a tire disposed within the mould.

2. In a tire vulcanizer, a tire receiving mould having spaced side portion, means for applying pressure to a tire disposed within said mould comprising a member bridging the side portions of said mould and carrying a clamp screw for applying said pressure, and rollers carried by the side portions of said mould providing bearings for said member whereby the latter is freely movable to permit correct positioning of said clamp screw with respect to a tire disposed within the mould.

In witness whereof we have signed this specification.

ALBERT MATTHEWS.
VICTOR ST. CLAIR MALLEY.
HENRY WILLIAM RAWLEY.